(12) United States Patent
Lee

(10) Patent No.: US 11,945,289 B2
(45) Date of Patent: Apr. 2, 2024

(54) SLIDING DOOR DEVICE FOR VEHICLE

(71) Applicants: Hyundai Motor Company, Seoul (KR); Kia Corporation, Seoul (KR)

(72) Inventor: Jaeseung Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/959,849

(22) Filed: Oct. 4, 2022

(65) Prior Publication Data
US 2023/0202272 A1    Jun. 29, 2023

(30) Foreign Application Priority Data
Dec. 24, 2021  (KR) .................. 10-2021-0187208

(51) Int. Cl.
E05D 15/10      (2006.01)
B60J 5/06       (2006.01)
B60R 16/02      (2006.01)

(52) U.S. Cl.
CPC ............ *B60J 5/06* (2013.01); *B60R 16/0207* (2013.01); *E05D 15/101* (2013.01); *E05D 15/1047* (2013.01); *E05Y 2201/624* (2013.01); *E05Y 2201/684* (2013.01); *E05Y 2201/688* (2013.01); *E05Y 2400/654* (2013.01); *E05Y 2900/531* (2013.01)

(58) Field of Classification Search
CPC ......... B60J 5/06; B60J 5/047; B60R 16/0207; B60R 16/027; B60R 16/03; E05D 15/101; E05D 15/1047; E05D 2015/1026; E05D 11/0081; E05Y 2201/624; E05Y 2201/688; E05Y 2201/684; E05Y 2400/654; E05Y 2400/656; E05Y 2900/531; B60Y 2200/11
USPC .......................................................... 49/360
See application file for complete search history.

(56) References Cited

U.S. PATENT DOCUMENTS 6,358,073 B1 *  3/2002  Jhanson ............. B60R 16/0207
                                                     439/4
6,494,523 B2 * 12/2002  Kobayashi .......... B60R 16/0207
                                                    361/826
6,996,967 B2 *  2/2006  Kobayashi ............ E05F 15/646
                                                     59/900
(Continued)

FOREIGN PATENT DOCUMENTS

DE   102022210912 A1 *  6/2023  ................ B60J 5/06
EP       1314613 A2 *  5/2003  ........... B60R 16/027

*Primary Examiner* — Jerry E Redman
(74) *Attorney, Agent, or Firm* — MORGAN, LEWIS & BOCKIUS LLP

(57) ABSTRACT

A sliding door device for a vehicle includes a door arm including a first end portion rotatably connected to an end portion of the door and a second end portion movable along a side sill of the vehicle body, a door power connection portion provided in the door arm, and a vehicle power connection portion provided in a position corresponding to the door power connection portion of the vehicle body and electrically connected to the door power connection portion according to rotation of the door arm, wherein the vehicle power connection portion includes: a first vehicle power connection portion electrically connected to the door power connection portion when the door is closed, and a second vehicle power connection portion electrically connected to the door power connection portion when the door is opened.

12 Claims, 13 Drawing Sheets

(56) References Cited

U.S. PATENT DOCUMENTS

| | | | | |
|---|---|---|---|---|
| 7,042,738 B2* | 5/2006 | Tsubaki | ............... | B60R 16/0215 |
| | | | | 174/72 A |
| 7,669,368 B2* | 3/2010 | Kuhnen | ............... | H02G 11/006 |
| | | | | 49/502 |
| 8,247,921 B2* | 8/2012 | Ushiyama | ............ | H02G 11/006 |
| | | | | 307/9.1 |
| 2003/0184118 A1* | 10/2003 | Sano | .................... | H02G 11/006 |
| | | | | 296/155 |
| 2008/0210828 A1* | 9/2008 | Kogure | ............... | B60R 16/0215 |
| | | | | 248/65 |
| 2018/0178740 A1* | 6/2018 | Tomosada | ............... | H02G 11/00 |
| 2023/0202273 A1* | 6/2023 | Lee | .................... | E05D 15/1047 |
| | | | | 296/146.1 |
| 2023/0271567 A1* | 8/2023 | Kogure | ............... | B60R 16/0207 |
| | | | | 49/381 |
| 2023/0271571 A1* | 8/2023 | Kogure | ............... | E05D 15/0621 |
| | | | | 174/72 A |

* cited by examiner

SLIDING DOOR DEVICE FOR VEHICLE

CROSS-REFERENCE TO RELATED APPLICATION

The present application claims priority to Korean Patent Application No. 10-2021-0187208 filed on Dec. 24, 2021, the entire contents of which is incorporated herein for all purposes by this reference.

BACKGROUND OF THE PRESENT DISCLOSURE

Field of the Present Disclosure

The present disclosure relates to a sliding door device for a vehicle, and more particularly, to a sliding door device for a vehicle configured to open or close a door opening of a vehicle body by sliding forwards and backwards in a longitudinal direction of the vehicle.

Description of Related Art

In general, a vehicle includes a vehicle compartment having a predetermined size in which a driver or an accompanying occupant may ride, and a vehicle compartment opening/closing door is provided in the vehicle body to open or close the vehicle compartment.

In the case of a car, the compartment opening/closing door includes a front door provided in the front in the longitudinal direction of the vehicle and a rear door provided in the rear in the longitudinal direction of the vehicle, and the front door and the rear door are usually provided to be rotatable by the medium of a hinge in the vehicle body.

In the case of a van which may accommodate many people, the compartment opening/closing door slides back and forth in the longitudinal direction of the vehicle to open or close the compartment.

In the sliding-type compartment opening/closing door of a van, the compartment opening/closing door moves backward in the longitudinal direction of the vehicle to open the vehicle compartment, but moves forward in the longitudinal direction of the vehicle to close the compartment, so that a space required for opening and closing the door is smaller than that of the hinge-type vehicle opening/closing door of a vehicle and a door opening formed in the vehicle body may be completely opened even in a narrow opening and closing space.

However, in the case of the existing sliding-type vehicle compartment opening/closing door, when the door is opened and closed, a space in which a door arm is provided to penetrate into a side sill portion of the vehicle is excessive due to a fixed sliding door arm structure, so a height of a floor of the vehicle needs to be increased to secure the space.

Furthermore, in the existing power sliding compartment opening/closing door, the sliding door should be automatically closed by operating a switch or an outside handle after the door is opened, and a power cable plays the role of power and signal transmission. Such a power cable component increases cost and difficulty in layout configuration.

Furthermore, a manual-type sliding compartment opening/closing door without a power cable has a problem in that power is not connected after the door is opened.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sliding door structure in which power is connected when a door is opened or closed by an electrical connection of a door power connection device mounted on a door arm and a vehicle power connection portion mounted on a vehicle body, implementing a power sliding door without a power cable and solving a problem of excessive space for the door arm to penetrate into a side sill portion of the vehicle.

Various aspects of the present disclosure are directed to providing a sliding door device for a vehicle including: a door opening and closing a door opening formed in a vehicle body; a door arm including a first end portion rotatably connected to an end portion of the door and a second end portion movable along a side sill of the vehicle body; a door power connection portion provided in the door arm; and a vehicle power connection portion provided in a position corresponding to the door power connection portion of the vehicle body and electrically connected to the door power connection portion according to rotation of the door arm, wherein the vehicle power connection portion includes: a first vehicle power connection portion electrically connected to the door power connection portion when the door is closed; and a second vehicle power connection portion electrically connected to the door power connection portion when the door is opened.

A sliding door device may further include: a lower slider coupled to the second end portion of the door arm and provided to move linearly along the side sill of the vehicle body; and a lower arm plate connecting the second end portion of the door arm and the lower slider and provided to rotate and linearly move when the lower slider moves along the side sill.

The door power connection portion may include a door power plate provided in the door arm; a door power connection pin provided to be externally exposed within the door power plate and connected to the vehicle power connection portion to transmit and receive power required for the door when the door arm is rotated; and a door power wiring connected to the door power connection pin to transmit and receive the power required for the door.

The first vehicle power connection portion may include: a first vehicle power plate provided in the vehicle body; a first vehicle power connection pin provided to be externally exposed within the first vehicle power plate, and connected to the door power connection portion to transmit and receive power required for the door when the door is closed; and a first vehicle power wiring connected to the first vehicle power connection pin to transmit and receive the power required for the door.

When the door is closed, the door arm may rotate toward the first vehicle power connection portion, and the door power connection pin may come into contact with the first vehicle power connection pin to transmit and receive power required for the door.

The second vehicle power connection portion may include a second vehicle power plate provided in the vehicle body; a second vehicle power connection pin provided to be externally exposed within the second vehicle power plate, and connected to the door power connection portion to transmit and receive power required for the door when the door is opened; and a second vehicle power wiring connected to the second vehicle power connection pin to transmit and receive the power required for the door.

When the door is opened, the door arm may rotate toward the second vehicle power connection portion, and the door power connection pin may come into contact with the second vehicle power connection pin to transmit and receive power required for the door.

the other end portion of the door arm, the lower slider, and the lower arm plate may be connected in a vertical direction of the vehicle body by an arm pin, and the door arm and the lower arm plate may be rotated around the arm pin.

The other end portion of the door arm may be provided in two layers in the vertical direction, and the lower slider may be coupled by the arm pin between the other end portions of the door arm provided in two layers.

The door power connection portion may be disposed between second end portions of the door arm provided in two layers.

The lower arm plate may be rotatably coupled to an upper surface of the door arm by the arm pin.

A plurality of first rollers may be formed on the lower arm plate and protrude at a predetermined interval, and the first rollers may be inserted into a rail formed in the longitudinal direction of the vehicle body to move therealong.

The first rollers may be provided so that two rollers having a first height among the first rollers and two rollers having a second height lower than the first height among the first rollers are alternately disposed with each other, and the rail may be formed in plurality in a depth corresponding to the height of each of the two rollers having the first height among the first rollers and the two rollers having the second height.

One end portion of the door arm may be hingedly rotatably connected to the door by a door pin.

A second roller may be formed to protrude from an upper surface between one end portion and the other end portion of the door arm so that the door arm moves along a path toward the outside of the vehicle body.

According to various exemplary embodiments of the present disclosure, by adopting a sliding door structure implementing an electrical connection of a door power connection device mounted on a door arm and a vehicle power connection portion mounted on a vehicle body, a power cable component may be eliminated to reduce costs and freedom of layout may be improved.

Furthermore, a flat structure of the vehicle body is realized by eliminating the amount of indoor penetration into the vehicle body by the door arm, and thus a step height of the vehicle body may be reduced.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
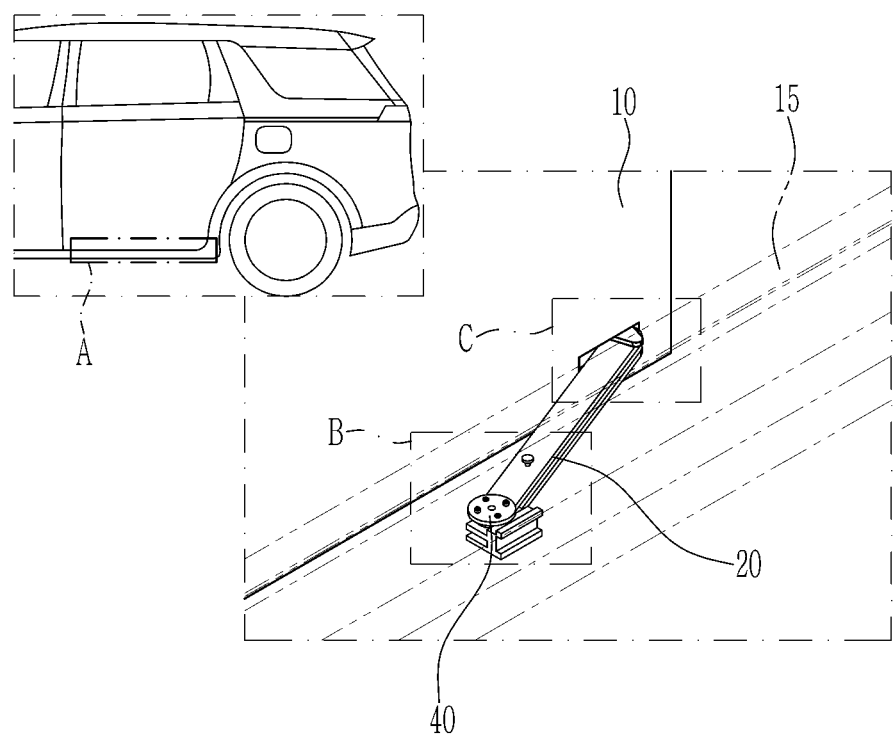
FIG. 1 is a schematic view showing a sliding door device for a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Exemplary embodiments of the present disclosure will be described in detail below with reference to the accompanying drawings so that those skilled in the art to which an exemplary embodiment of the present disclosure pertains may easily carry out the exemplary embodiments of the present disclosure. The present disclosure may be embodied in many different forms and is not limited to the exemplary embodiments described herein.

Furthermore, in various exemplary embodiments of the present disclosure, components having the same configuration are typically described in an exemplary embodiment using the same reference numerals, and only component different from the exemplary embodiment will be described in other exemplary embodiments of the present disclosure.

The drawings are schematic and not drawn to scale. The relative dimensions and ratios of the components in the drawings may be exaggerated or diminished in size for the sake of clarity and convenience, and such arbitrary dimensions are merely illustrative and are not limitative. Furthermore, the same reference symbol is used for the same structure, element or part shown in two or more drawings in order to represent similar features. When it is mentioned that a first component is located "above" or "on" a second component, the first component may be located directly "above" or "on" the second component or a third component may be interposed therebetween.

The exemplary embodiment of the present disclosure specifically represents various exemplary embodiments of the present disclosure. As a result, various modifications of the diagram are expected. Accordingly, various exemplary embodiments are not limited to specific shapes of shown regions, and for example, also include modifications of the shape by manufacturing.

Hereinafter, a structure of a sliding door device for a vehicle according to various exemplary embodiments of the present disclosure will be described in detail with reference to the accompanying drawings.

Figure 2:
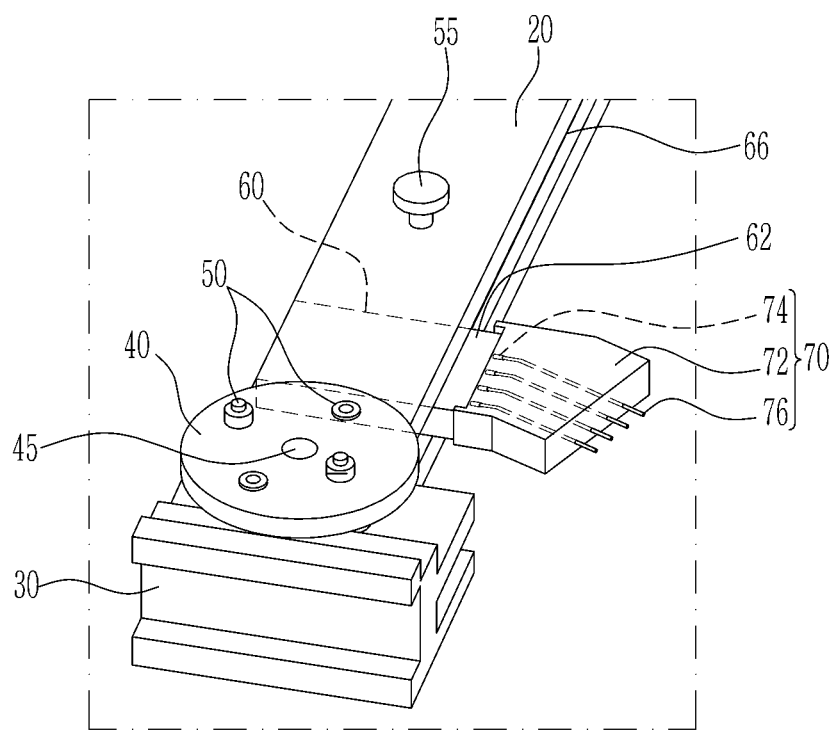
FIG. 2 is an enlarged view of part 'B' of FIG. 1.
Figure 3:
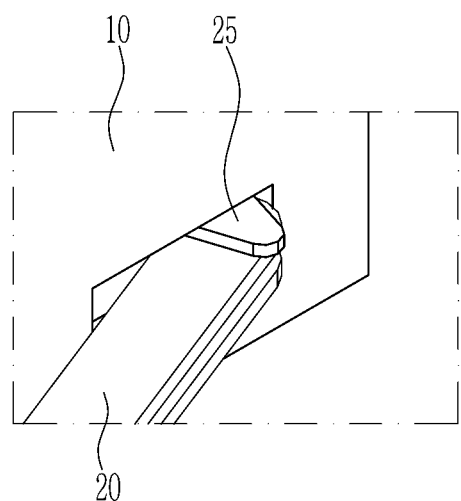
FIG. 3 is an enlarged view of part 'C' of FIG. 1.

FIG. 1 is a schematic view showing a sliding door device for a vehicle according to various exemplary embodiments of the present disclosure, FIG. 2 is an enlarged view of portion 'B' of FIG. 1, and FIG. 3 is an enlarged view of portion 'C' of FIG. 1.

Referring to FIG. 1, a sliding door device for a vehicle according to various exemplary embodiments of the present disclosure may be applied to a lower portion of a rear door 10 provided at the rear in a longitudinal direction of the vehicle, that is, portion 'A' of the vehicle, and may be applied to a structure in which the rear door 10 is opened or closed according to inward and outward direction of the vehicle and forward and backward sliding movement in a longitudinal direction of the vehicle. Furthermore, the structure of the sliding door device for a vehicle according to the exemplary embodiment of the present disclosure may be applied to a front door, as well as the rear door 10.

A sliding door device for a vehicle according to various exemplary embodiments of the present disclosure includes the door 10, a door arm 20, a lower slider 30, a lower arm plate 40, a door power connection portion 60, and vehicle power connection portions 70 and 80.

The door 10 opens or closes a door opening formed in the vehicle body, and the door arm 20 is connected to the door 10 and the vehicle body. One end portion of the door arm 20 may be rotatably connected to one side of the door 10, and the other end portion of the door arm 20 may be rotatably and linearly connected to a side sill 15 of the vehicle body. The side sill 15 may be disposed on a lower portion of the side of the vehicle body in the longitudinal direction of the vehicle body, and the side sill 15 may include a side rail providing a path so that the other end portion of the door arm 20 may move.

The lower slider 30 may be coupled to the other end portion of the door arm 20, and the lower slider 30 may move linearly along a side rail provided in the longitudinal direction of the side sill 15.

Furthermore, the lower arm plate 40 connecting the other end portion of the door arm 20 and the lower slider 30 is coupled to the other end portion of the door arm 20, and the lower arm plate 40 may rotate and move linearly when the lower slider 30 moves along the side rail provided in the side sill 15. The lower arm plate 40 may also be provided to cycloidally rotate along a cycloid rail formed in the longitudinal direction of the vehicle body provided in the side sill 15.

Meanwhile, on the lower arm plate 40, a plurality of first rollers 50 may be formed to be spaced from each other in a circumferential direction of the lower arm plate 40 at regular intervals to protrude, and the first roller 50 may be inserted into each of the four cycloid rails provided in the side sill 15 to move. The other end portion of the door arm 20, the lower slider 30, and the lower arm plate 40 may be coupled in a vertical direction of the vehicle body by an arm pin 45, and the door arm 20 and the lower arm plate 40 may be rotated about the arm pin 45 with respect to the lower slider 30.

Furthermore, the second roller 55 may be formed to protrude from the upper surface between one end portion and the other end portion of the door arm 20 so that the door arm 20 moves along a path turning toward the outside of the vehicle body.

The door power connection portion 60 may be provided between the lower slider 30 and one end portion of the door arm 20. The other end portion of the door arm 20 may be provided in two layers in a vertical direction of the vehicle body, and the door power connection portion 60 may be positioned between the other end portions of the door arm 2 provided in two layers. Both end portions of the door power connection portion 60 may be coupled to the vehicle power connection portions 70 and 80.

The door power connection portion 60 includes a door power plate 62 provided in the door arm 20, a door power connection pin 64 provided at both end portions of the door power plate 62 to be externally exposed of the door power plate 62, and a door power wiring 66 connected to the door power connection pin 64.

The door power connection pin 64 may be provided in plurality, and when the door arm 20 rotates, the door power connection pin 64 may be connected to the vehicle power connection portions 70 and 80 at both end portions of the door power plate 62 to supply power required for the door 10. Also, the door power wiring 66 may be connected to the door power connection pin 64 to transmit and receive power required for the door 10. The door power wiring 66 may extend from the door power plate 62 to the door side in the longitudinal direction of the door arm 20 over the inside of the door arm 20.

The vehicle power connection portions 70 and 80 are provided in the vehicle body at a position corresponding to the door power connection portion 60, and as the door arm 20 rotates, the vehicle power connection portions 70 and 80 are electrically connected to the door power connection portion 60. The vehicle power connection portions 70 and 80 may be provided at two portions of the vehicle body so that both end portions of the door power connection portion 60 are coupled to each of the vehicle power connection portions 70 and 80 according to rotation of the door arm 20.

Meanwhile, as shown in FIG. 3, one end portion of the door arm 20 may be hingedly rotatably connected to the door 10 by a door pin 25. The door pin 25 may vertically pass through one end portion of the door arm 20 through a protrusion formed in the door 10 to connect the door arm 20 to the door 10.

Figure 4:
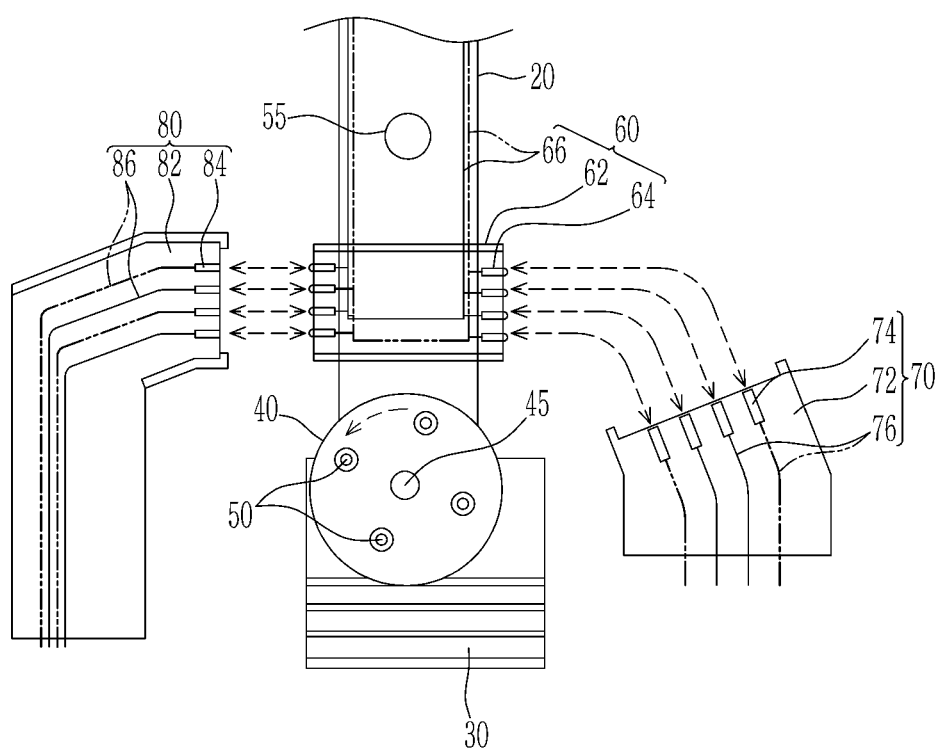
FIG. 4 is a view schematically illustrating an electrical connection relationship of a sliding door device for a vehicle according to various exemplary embodiments of the present disclosure.

FIG. 4 is a view schematically illustrating an electrical connection relationship of a sliding door device for a vehicle according to various exemplary embodiments of the present disclosure.

Referring to FIG. 4, the vehicle power connection portions 70 and 80 include a first vehicle power connection portion 70 and a second vehicle power connection portion 80. The first vehicle power connection portion 70 is coupled to one end portion of the door power connection portion 60 to be electrically connected when the door 10 is closed, that is, when the door arm 20 forms a small angle in the longitudinal direction of the lower slider 30.

The second vehicle power connection portion 80 is coupled to the other end portion of the door power connection portion 60 to be electrically connected when the door 10 is opened, that is, when the door arm 20 is almost perpendicular to the longitudinal direction of the lower slider 30. Therefore, in the opened or closed states of the door 10, the vehicle power connection portions 70 and 80 and the door power connection portion 60 may be electrically connected, so that power required for realizing the sliding door may be transmitted and received without a power cable.

The first vehicle power connection portion 70 includes a first vehicle power plate 72 provided on the vehicle body, a first vehicle power connection pin 74 provided to be externally exposed within the first vehicle power plate 72, and a first vehicle power wiring 76 connected to the first vehicle power connection pin 74.

The first vehicle power connection pin 74 may be provided in plurality, and when the door 10 is closed, the first vehicle power connection pins 74 may be connected to one end portion of the door power connection portion 60 to transmit and receive power required for the door 10. Also, the first vehicle power wiring 76 may be connected to each of the first vehicle power connection pins 74 to transmit and receive power required for the door 10. The first vehicle power wiring 76 may extend in a longitudinal direction of the first vehicle power plate 72 within the first vehicle power plate 72.

The second vehicle power connection portion 80 includes a second vehicle power supply plate 82 provided on the vehicle body, a second vehicle power connection pin 84 provided to be externally exposed in the second vehicle power plate 82, and a second vehicle power wiring 86 connected to the second vehicle power connection pin 84.

The second vehicle power connection pin 84 may be provided in plurality, and when the door 10 is opened, the second vehicle power connection pin 84 may be connected to the other end portion of the door power connection portion 60 to transmit and receive power required for the door 10. Furthermore, the second vehicle power wiring 86 may be connected to each of the second vehicle power connection pins 84 to transmit and receive power required for the door 10. The second vehicle power wiring 86 may extend in the longitudinal direction of the second vehicle power plate 82 within the second vehicle power plate 82.

Figure 5A:
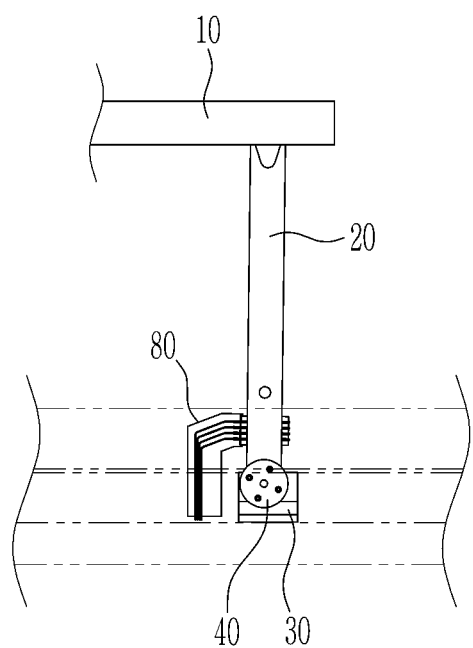
FIG. 5A, FIG. 5B and FIG. 5C are views exemplarily illustrating an operation sequence of a sliding door device for a vehicle according to various exemplary embodiments of the present disclosure.
Figure 5B:
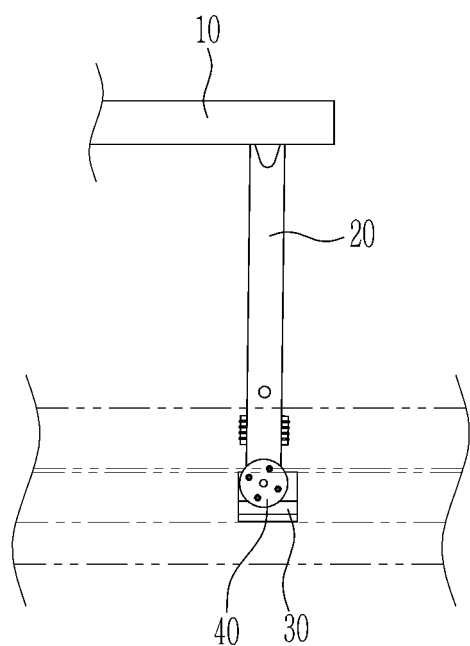
Figure 5C:
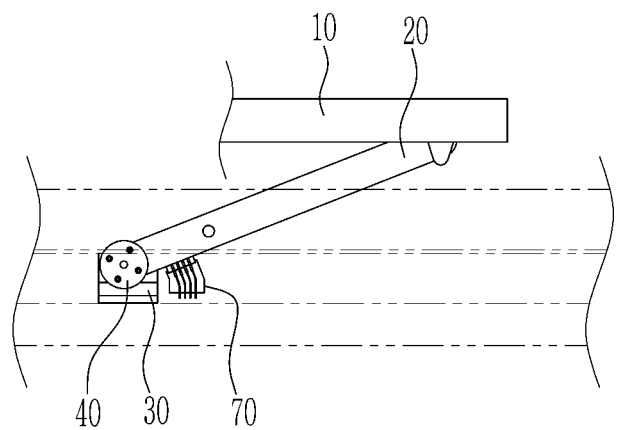

FIG. 5A, FIG. 5B and FIG. 5C are views exemplarily illustrating an operation sequence of a sliding door device for a vehicle according to various exemplary embodiments of the present disclosure.

Referring to FIG. 5A, in the fully opened state of the door 10, the door arm 20 is substantially perpendicular to the longitudinal direction of the lower slider 30, and the other end portion of the door power connection portion 60 is connected to the second vehicle power connection portion 80 so that the door power connection portion 60 and the second vehicle power connection portion 80 are electrically connected. At the instant time, the second vehicle power connection pin 84 and the door power connection pin 64 are in contact with each other, and power required for the door 10 is transmitted and received between the door 10 and the vehicle body through the second vehicle power wiring 86 and the door power wiring 66.

In a state in which the door 10 slides, the lower slider 30 moves linearly along the side sill 15 of the vehicle body, and the electrical connection between the door power connection portion 60 and the second vehicle power connection portion 80 is cut off in FIG. 5B.

Thereafter, when the closed state of the door 10 approaches, the lower arm plate 40 rotates, the lower arm 20 forms a small angle in the longitudinal direction of the lower slider 30, and one end portion of the door power connection portion 60 is coupled to the first vehicle power connection portion 70, so that the door power connection portion 60 and the first vehicle power connection portion 70 are electrically connected in FIG. 5C. At the instant time, the first vehicle power connection pin 74 and the door power connection pin 64 are in contact with each other, and power required for the door 10 is transmitted and received between the door 10 and the vehicle body through the first vehicle power wiring 76 and the door power wiring 66.

Figure 6:
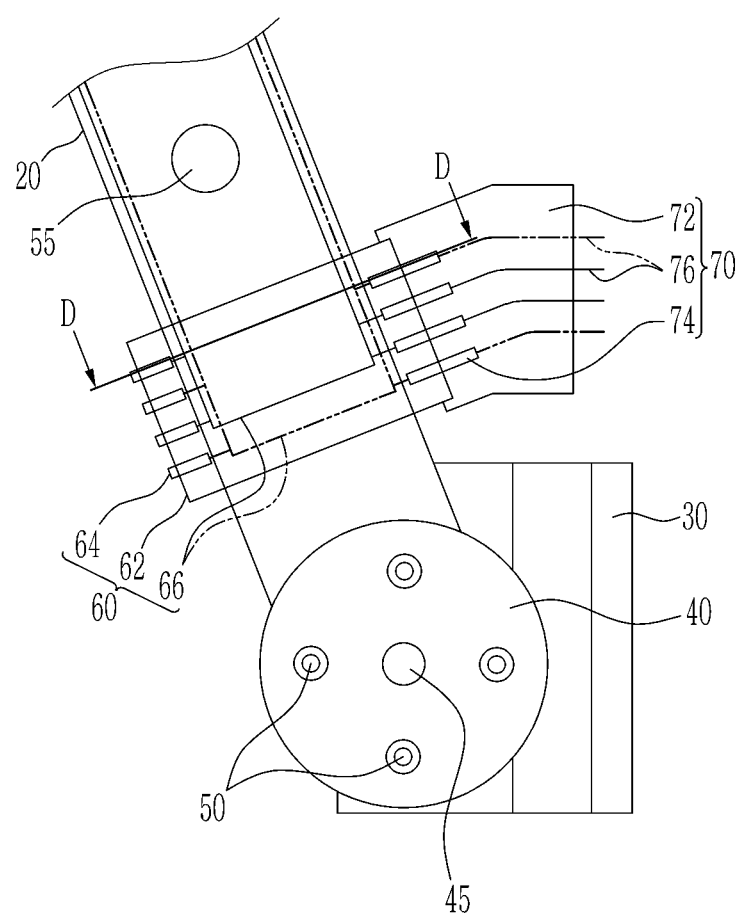
FIG. 6 is a view exemplarily illustrating a state in which a door power connection portion and a vehicle power connection portion are electrically connected when a door of a sliding door device for a vehicle is closed according to various exemplary embodiments of the present disclosure.
Figure 7:
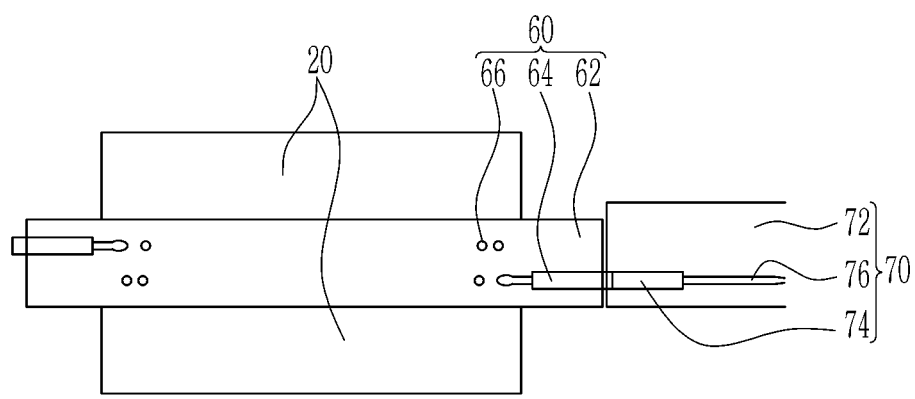
FIG. 7 is a view showing a state taken along line 'D-D' of FIG. 6.

FIG. 6 is a view showing a state in which a door power connection portion and a vehicle power connection portion are electrically connected when the door of the sliding door device of the vehicle is closed according to various exemplary embodiments of the present disclosure, and FIG. 7 is a view taken along line 'D-D' of FIG. 6.

Referring to FIG. 6 and FIG. 7, when the door 10 is in the closed state, the lower arm 20 is in a state forming a small angle in the longitudinal direction of the lower slider 30, and one end portion of the door power connection portion 60 is coupled to the first vehicle power connection portion 70.

Accordingly, the first vehicle power connection pin 74 and the door power connection pin 64 come into contact with each other to form an electrical connection. The door power wiring 66 is connected to the door power connection pin 64 and extends toward the door in the longitudinal direction of the door arm 20 within the door power plate 62 over the inside of the door arm 20.

The first vehicle power wiring 76 extends in the longitudinal direction of the first vehicle power plate 72 within the first vehicle power plate 72 to be connected to the vehicle body. Furthermore, the door arm 20 may be provided in two layers in the vertical direction of the vehicle body, and the door power plate 62 may be fixed between the door arms 20 provided in two layers.

Figure 8:
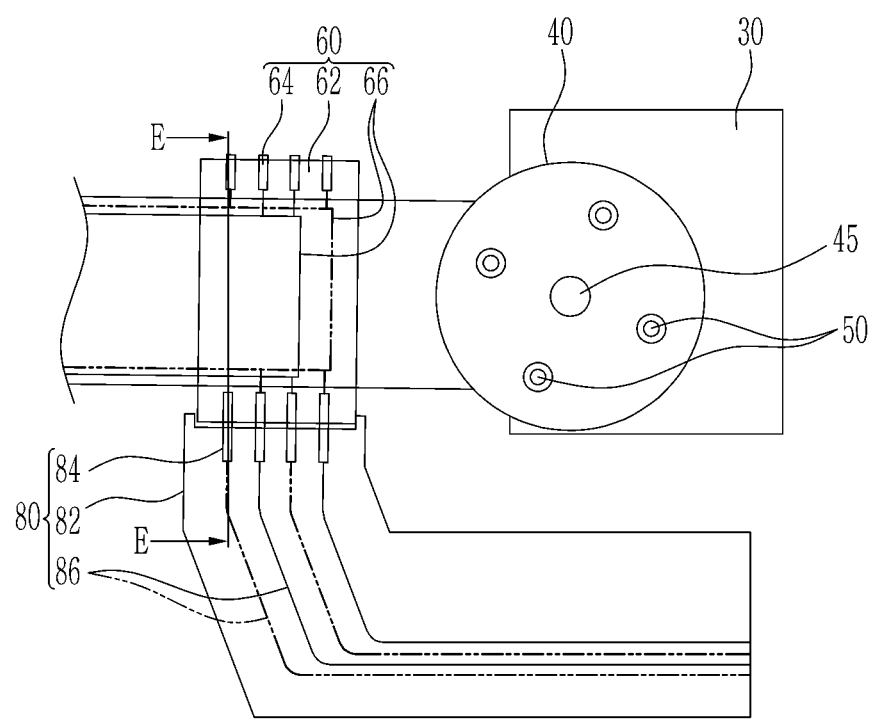
FIG. 8 is a view exemplarily illustrating a state in which a door power connection portion and a vehicle power connection portion are electrically connected when a door of the sliding door device for a vehicle is opened according to various exemplary embodiments of the present disclosure.
Figure 9:
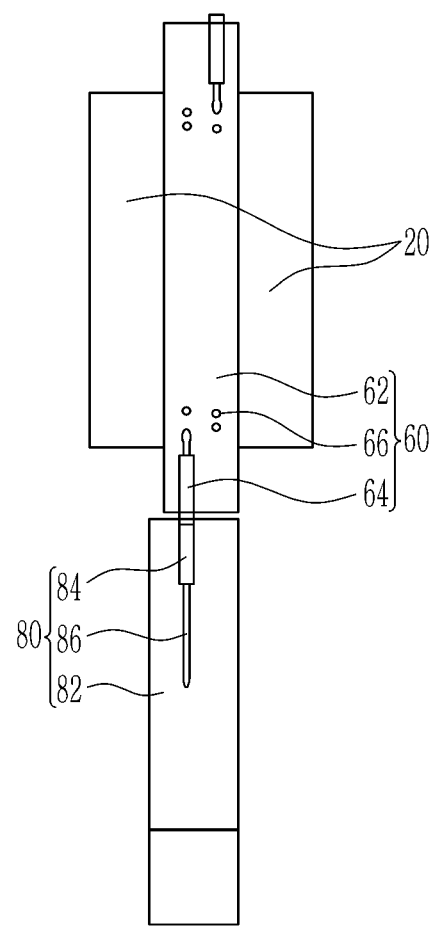
FIG. 9 is a view showing a state taken along line 'E-E' of FIG. 8.

FIG. 8 is a view showing a state in which a door power connection portion and a vehicle power connection portion are electrically connected when a door of a sliding door device for a vehicle is opened according to various exemplary embodiments of the present disclosure, and FIG. 9 is a view taken along line 'E-E' of FIG. 8.

Referring to FIG. 8 and FIG. 9, when the door 10 is in an open state, the lower arm 20 is substantially perpendicular to the longitudinal direction of the lower slider 30, and the other end portion of the door power connection portion 60 is coupled to the second vehicle power connection portion 80. Accordingly, the second vehicle power connection pin 84 and the door power connection pin 64 come into contact with each other to form an electrical connection. In the instant case, the second vehicle power wiring 86 extends in the longitudinal direction of the second vehicle power plate 82 within the second vehicle power plate 82 to be connected to the vehicle body.

Figure 10:
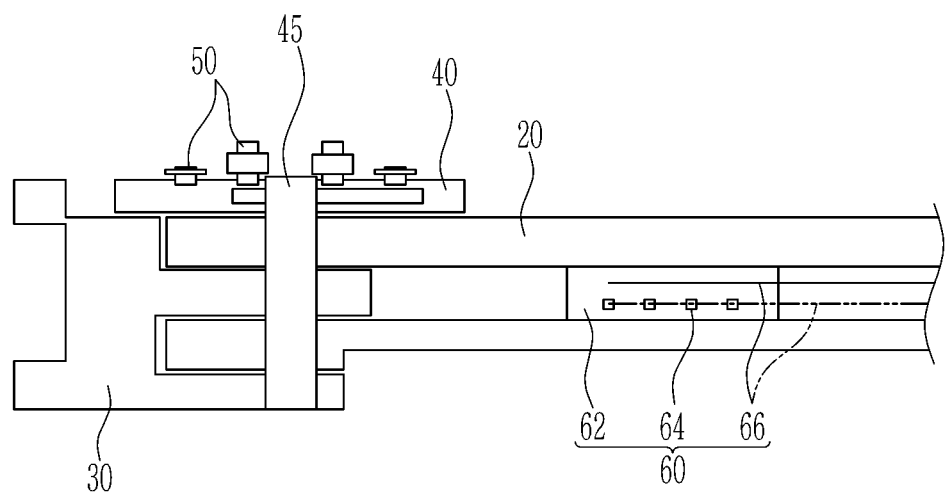
FIG. 10 is a cross-sectional view exemplarily illustrating a state in which a door arm, a lower slider, and a lower arm plate of a sliding door device for a vehicle according to various exemplary embodiments of the present disclosure are coupled.
Figure 11:
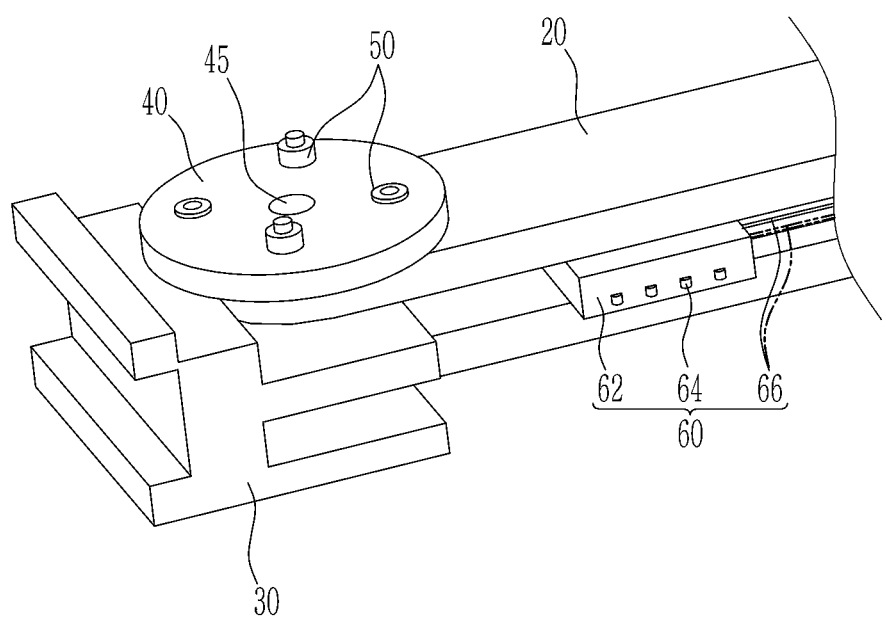
FIG. 11 is a view exemplarily illustrating a state in which a door power connection portion of a sliding door device for a vehicle is provided in a door arm according to various exemplary embodiments of the present disclosure.

FIG. 10 is a cross-sectional view exemplarily illustrating a state in which a door arm, a lower slider, and a lower arm plate of a sliding door device for a vehicle according to various exemplary embodiments of the present disclosure are coupled, and FIG. 11 is view showing a state in which a door power connection portion of a sliding door device for a vehicle according to various exemplary embodiments of the present disclosure is provided in a door arm.

Referring to FIG. 10, and FIG. 11, the other end portion of the door arm 20 may be provided in two layers in the vertical direction, and the lower slider 30 may be coupled between the other end portion of the door arm 20 provided in two layers by the arm pin 45. The other end portion of the door arm 20, the lower slider 30, and the lower arm plate 40 may be connected in the vertical direction of the vehicle body by the arm pin 45, and the door arm 20 and the lower arm plate 40 may rotate about the arm pin 45. A center portion of the lower arm plate 40 may be coupled to an upper surface of the door arm 20 to be rotatable about the arm pin 45. Furthermore, the door power connection portion 60 is provided between the lower slider 30 and one end portion of the door arm 20 and between the door arms 20 provided in two layers, and the door power wiring 66 may extend toward the door 10 in a space therebetween.

A plurality of first rollers 50 having different heights may be provided on an upper surface of the lower arm plate 40, and the first rollers 50 may be inserted into rails formed in the longitudinal direction of the vehicle body to depths corresponding to the respective heights of the first rollers 50. The first rollers 50 may be provided so that two rollers having a first height among the first rollers and two rollers having a second height lower than the first height among the first rollers are alternately disposed with each other, and the rail may be formed in plurality to depths corresponding to the respective heights of four rollers 50.

As described above, according to various exemplary embodiments of the present disclosure, by adopting a sliding door structure implementing an electrical connection of the door power connection device mounted on the door arm and the vehicle power connection portion mounted on the vehicle body, a power cable component may be eliminated, reducing costs and improving a layout freedom.

Furthermore, a flat structure of the vehicle body is realized by eliminating the amount of intrusion into the vehicle body internal by the door arm, and thus the step height of the vehicle body may be reduced.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sliding door apparatus for a vehicle, the sliding door apparatus comprising:
   a door for opening and closing a door opening formed in a vehicle body;
   a door arm including a first end portion rotatably connected to an end portion of the door and a second end portion movable along a side sill of the vehicle body;
   a door power connection portion provided in the door arm; and
   a vehicle power connection portion provided in a position corresponding to the door power connection portion of the vehicle body and electrically connected to the door power connection portion according to rotation of the door arm,
   wherein the vehicle power connection portion includes:
      a first vehicle power connection portion electrically connected to the door power connection portion when the door is closed; and
      a second vehicle power connection portion electrically connected to the door power connection portion when the door is opened;
   a lower slider coupled to the second end portion of the door arm and provided to move linearly along the side sill of the vehicle body; and
   a lower arm plate connecting the second end portion of the door arm and the lower slider and provided to rotate and linearly move when the lower slider moves along the side sill,
   wherein the door power connection portion includes:
      a door power plate provided in the door arm;
      a door power connection pin provided to be externally exposed within the door power plate and connected to the vehicle power connection portion to transmit and receive power required for the door when the door arm is rotated; and
      a door power wiring connected to the door power connection pin to transmit and receive the power required for the door.

2. The sliding door apparatus of claim 1, wherein the door power wiring extends from the door power plate to a door side in a longitudinal direction of the door arm over the inside of the door arm.

3. The sliding door apparatus of claim 1, wherein the first vehicle power connection portion includes:
   a first vehicle power plate provided in the vehicle body;
   a first vehicle power connection pin provided to be externally exposed within the first vehicle power plate, and connected to the door power connection portion to transmit and receive power required for the door when the door is closed; and
   a first vehicle power wiring connected to the first vehicle power connection pin to transmit and receive the power required for the door.

4. The sliding door apparatus of claim 3, wherein when the door is closed,
   the door arm rotates toward the first vehicle power connection portion, and
   the door power connection pin comes into contact with the first vehicle power connection pin to transmit and receive the power required for the door.

5. The sliding door apparatus of claim 1, wherein the second vehicle power connection portion includes:
   a second vehicle power plate provided in the vehicle body;
   a second vehicle power connection pin provided to be externally exposed within the second vehicle power plate, and connected to the door power connection portion to transmit and receive power required for the door when the door is opened; and a second vehicle power wiring connected to the second vehicle power connection pin to transmit and receive the power required for the door.

6. The sliding door apparatus of claim 5, wherein when the door is opened,
the door arm rotates toward the second vehicle power connection portion, and
the door power connection pin comes into contact with the second vehicle power connection pin to transmit and receive the power required for the door.

7. The sliding door apparatus of claim 1, wherein the first end portion of the door arm is hingedly rotatably connected to the door by a door pin.

8. The sliding door apparatus of claim 7, wherein a second roller is mounted on an upper surface between the first end portion and the second end portion of the door arm so that the door arm moves along a path toward the outside of the vehicle body.

9. A sliding door apparatus for a vehicle, the sliding door apparatus comprising:
a door for opening and closing a door opening formed in a vehicle body;
a door arm including a first end portion rotatably connected to an end portion of the door and a second end portion movable along a side sill of the vehicle body;
a door power connection portion provided in the door arm; and
a vehicle power connection portion provided in a position corresponding to the door power connection portion of the vehicle body and electrically connected to the door power connection portion according to rotation of the door arm,
wherein the vehicle power connection portion includes:
a first vehicle power connection portion electrically connected to the door power connection portion when the door is closed; and
a second vehicle power connection portion electrically connected to the door power connection portion when the door is opened;
a lower slider coupled to the second end portion of the door arm and provided to move linearly along the side sill of the vehicle body; and
a lower arm plate connecting the second end portion of the door arm and the lower slider and provided to rotate and linearly move when the lower slider moves along the side sill,
wherein the second end portion of the door arm, the lower slider, and the lower arm plate are connected in a vertical direction of the vehicle body by an arm pin, and the door arm and the lower arm plate are rotated around the arm pin, and
wherein the second end portion of the door arm is provided in two layers in the vertical direction, and the lower slider is coupled by the arm pin between the second end portions of the door arm provided in the two layers.

10. The sliding door apparatus of claim 9, wherein the door power connection portion is disposed between the second end portions of the door arm provided in two layers.

11. The sliding door apparatus of claim 9, wherein the lower arm plate is rotatably coupled to an upper surface of the door arm by the arm pin.

12. A sliding door apparatus for a vehicle, the sliding door apparatus comprising:
a door for opening and closing a door opening formed in a vehicle body;
a door arm including a first end portion rotatably connected to an end portion of the door and a second end portion movable along a side sill of the vehicle body;
a door power connection portion provided in the door arm; and
a vehicle power connection portion provided in a position corresponding to the door power connection portion of the vehicle body and electrically connected to the door power connection portion according to rotation of the door arm,
wherein the vehicle power connection portion includes:
a first vehicle power connection portion electrically connected to the door power connection portion when the door is closed; and
a second vehicle power connection portion electrically connected to the door power connection portion when the door is opened;
a lower slider coupled to the second end portion of the door arm and provided to move linearly along the side sill of the vehicle body; and
a lower arm plate connecting the second end portion of the door arm and the lower slider and provided to rotate and linearly move when the lower slider moves along the side sill,
wherein a plurality of first rollers are mounted on the lower arm plate and disposed at a predetermined interval,
wherein the first rollers are inserted into a rail formed in a longitudinal direction of the vehicle body to move therealong,
wherein the first rollers are provided so that two rollers having a first height among the first rollers and two rollers having a second height lower than the first height among the first rollers are alternately disposed with each other, and
wherein the rail is formed in plurality in a depth corresponding to a height of each of the two rollers having the first height among the first rollers and the two rollers having the second height.

* * * * *